US011059492B2

(12) United States Patent
Govindjee et al.

(10) Patent No.: US 11,059,492 B2
(45) Date of Patent: Jul. 13, 2021

(54) MANAGING VEHICLE-ACCESS ACCORDING TO DRIVER BEHAVIOR

(71) Applicant: International Business Machines Corporation, Armonk, NY (US)

(72) Inventors: Anita Govindjee, Ithaca, NY (US); Cheng Xu, Beijing (CN); Su Liu, Austin, TX (US); Xue Yong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/180,300

(22) Filed: Nov. 5, 2018

(65) Prior Publication Data

US 2020/0139977 A1    May 7, 2020

(51) Int. Cl.
| | |
|---|---|
| *B60W 40/09* | (2012.01) |
| *B60R 25/04* | (2013.01) |
| *B60W 40/08* | (2012.01) |
| *B60R 25/25* | (2013.01) |

(52) U.S. Cl.
CPC .......... *B60W 40/09* (2013.01); *B60R 25/04* (2013.01); *B60R 25/25* (2013.01); *B60W 2040/0836* (2013.01); *B60W 2040/0845* (2013.01); *B60W 2040/0872* (2013.01); *B60W 2540/043* (2020.02); *B60W 2540/22* (2013.01); *B60W 2540/26* (2013.01); *B60W 2710/30* (2013.01); *B60W 2900/00* (2013.01)

(58) Field of Classification Search
None
See application file for complete search history.

(56) References Cited

U.S. PATENT DOCUMENTS

| | | | | |
|---|---|---|---|---|
| 5,751,072 A | * | 5/1998 | Hwang | B60R 25/04 180/287 |
| 6,974,326 B2 | * | 12/2005 | Marple-Horvat | A61B 5/18 434/236 |
| 7,213,766 B2 | * | 5/2007 | Ryan | G06F 13/385 235/472.02 |
| 7,227,472 B1 | * | 6/2007 | Roe | B60K 28/06 180/272 |

(Continued)

FOREIGN PATENT DOCUMENTS

WO    2015195958 A1    12/2015

OTHER PUBLICATIONS

"Brainwave Mapping System", An ip.com Prior Art Database Technical Disclosure, Authors et al.: Disclosed Anonymously, IP com No. IPCOM000247509D, ip.com Electronic Publication Date: Sep. 13, 2016, 5 pages.

(Continued)

*Primary Examiner* — Muhammad Adnan
(74) *Attorney, Agent, or Firm* — David K. Mattheis; William H. Hartwell; Nicholas L. Cadmus

(57) ABSTRACT

Managing vehicle operations according to driver behavior by: defining a multi-dimensional preemptive driver daily behavior (PDDB) data structure; defining a PDDB abnormal behavior criteria; and defining a PDDB abnormal behavior algorithm. Further, by: collecting PDDB data; acquiring a PDDB assessment according to the PDDB analysis; and preemptively communicating driver vehicle-access instructions according to the PDDB assessment.

18 Claims, 4 Drawing Sheets

(56) References Cited

U.S. PATENT DOCUMENTS

| | | | |
|---|---|---|---|
| 7,667,595 B2 * | 2/2010 | Komiya | G08B 25/008 |
| | | | 340/5.22 |
| 8,117,049 B2 | 2/2012 | Berkobin et al. | |
| 8,630,768 B2 | 1/2014 | McClellan et al. | |
| 8,818,748 B2 | 8/2014 | Hatlestad et al. | |
| 8,928,470 B2 * | 1/2015 | Morgan | B60K 28/063 |
| | | | 340/426.1 |
| 9,129,460 B2 * | 9/2015 | McClellan | G07C 5/008 |
| 9,149,212 B2 | 10/2015 | Mori | |
| 9,250,228 B2 * | 2/2016 | Nothacker | G06K 9/00885 |
| 9,374,463 B2 | 6/2016 | De Los Reyes et al. | |
| 9,440,646 B2 | 9/2016 | Fung et al. | |
| 9,878,663 B1 * | 1/2018 | Kochura | B60W 40/08 |
| 9,884,628 B1 * | 2/2018 | Grant | B60W 40/08 |
| 9,949,682 B2 * | 4/2018 | Zhang | A61B 5/746 |
| 10,004,431 B2 * | 6/2018 | Shuster | G06F 16/951 |
| 10,037,676 B1 * | 7/2018 | Scharf | G06F 8/61 |
| 10,229,592 B1 * | 3/2019 | Elsheemy | G08G 1/096725 |
| 2004/0083031 A1 * | 4/2004 | Okezie | A61B 5/145 |
| | | | 701/1 |
| 2006/0190419 A1 * | 8/2006 | Bunn | G06N 20/00 |
| | | | 706/2 |
| 2010/0010689 A1 * | 1/2010 | Yasushi | G08B 21/06 |
| | | | 701/1 |
| 2012/0206252 A1 * | 8/2012 | Sherony | B60W 30/12 |
| | | | 340/438 |
| 2013/0135092 A1 | 5/2013 | Wu et al. | |
| 2013/0335213 A1 * | 12/2013 | Sherony | G08G 1/167 |
| | | | 340/439 |
| 2014/0358475 A1 * | 12/2014 | Boulkenafed | G01B 21/16 |
| | | | 702/152 |
| 2015/0038123 A1 * | 2/2015 | Tuukkanen | H04W 4/025 |
| | | | 455/414.1 |
| 2015/0186714 A1 * | 7/2015 | Ren | H04N 7/183 |
| | | | 348/77 |
| 2015/0274017 A1 * | 10/2015 | Frye | H04L 43/06 |
| | | | 701/36 |
| 2016/0171885 A1 * | 6/2016 | Lynch | G08G 1/0129 |
| | | | 701/117 |
| 2016/0318521 A1 * | 11/2016 | Nothacker | B60W 50/12 |
| 2016/0339922 A1 * | 11/2016 | Schmidt | B60W 40/08 |
| 2018/0074495 A1 * | 3/2018 | Myers | G06Q 50/30 |
| 2018/0154898 A1 * | 6/2018 | Wrobel | B60W 10/26 |
| 2020/0216078 A1 * | 7/2020 | Katz | G06F 3/017 |

OTHER PUBLICATIONS

"Commercial Truck and Bus Safety", The Role of Safety Culture in Preventing Commercial Motor Vehicle Crashes, Synthesis 14, A Synthesis of Safety Practice, Transportation Research Board of the National Academies, 2007, 59 pages.

Mell et al., "The NIST Definition of Cloud Computing", Recommendations of the National Institute of Standards and Technology, Special Publication 800-145, Sep. 2011, 7 pages.

\* cited by examiner

MANAGING VEHICLE-ACCESS ACCORDING TO DRIVER BEHAVIOR

BACKGROUND

The disclosure relates generally to managing vehicle operations and specifically to controlling vehicle operations by preemptively managing driver vehicle access.

Monitoring human behavior is known. Speech patterns may be monitored and categorized, as may body temperature, skin galvanic state, heart and respiratory rates, blood oxygen levels and blood pressure. Using accelerometers and other sensors to monitor and track the motion of a user is also known. Biometric markers may be evaluated to identify a subject.

Mapping software, used in conjunction with either WiFi or Global Positioning System signal may be used to determine the location of the signal receiver to a high level of resolution.

Typical modern vehicles may be unlocked and started remotely utilizing wireless communications. The interaction is voluntary with a user deliberately sending a signal by pressing a control button on a key fob, or by engaging a proximity sensor of the vehicle while also presenting the key fob in proximity to the vehicle. These vehicles may also comprise transmission interlock systems enabling remote control over engaging the drive system of the vehicle. Typical interlock systems require only that the brake pedal of the vehicle be depressed to allow engaging the drive system.

SUMMARY

Aspects of the invention disclose methods, systems and computer readable media associated with managing vehicle access according to driver behavior by: defining a multi-dimensional preemptive driver daily behavior (PDDB) data structure; defining a PDDB abnormal behavior criteria; and defining a PDDB abnormal behavior algorithm. Further, by: collecting PDDB data; acquiring a PDDB assessment according to the PDDB analysis; and preemptively communicating driver vehicle-access instructions according to the PDDB assessment.

DETAILED DESCRIPTION

Impaired drivers represent a risk to themselves as well as to other drivers and pedestrians. Driver impairment may arise from alcohol consumption, pharmaceutical use, and driver medical conditions. Typical efforts to address impaired driver vehicle-access focus upon complex and expensive systems to test driver blood alcohol levels either directly or indirectly. Such systems may involve driver checkpoints or evaluating drivers exhibiting erratic driving behavior, and are not preemptive and may only address a single source of driver impairment. Ignition interlock systems require ongoing testing of a driver to ensure impairment does not arise while a driver is in control of a vehicle.

Preemptively denying impaired drivers operational control of vehicles significantly reduces any risk such individuals pose to themselves and others. Driver checkpoints to evaluate impairment are not preemptive, allowing impaired drivers control of their vehicle until they are identified at a checkpoint. Ignition interlock systems may prevent an impaired driver from controlling a vehicle but are complex, expensive and insufficiently reliable for general use. A system adapted to monitor a driver's daily behavior and to preemptively manage access against significant deviations from the driver's normal daily behavior is needed.

The disclosed methods and systems provide driver behavior analysis prior to affording the driver operational control of a vehicle. This carries the benefits of preventing any control of a vehicle by an impaired driver. Unlike current efforts to control operational access, the disclosed methods and systems do so without the need to add driver monitoring interlocks to each vehicle. The disclosure provides for driver monitoring using systems and methods which are separate from the vehicle itself thereby separating the computational resources needed from those of the vehicle.

Figure 1:
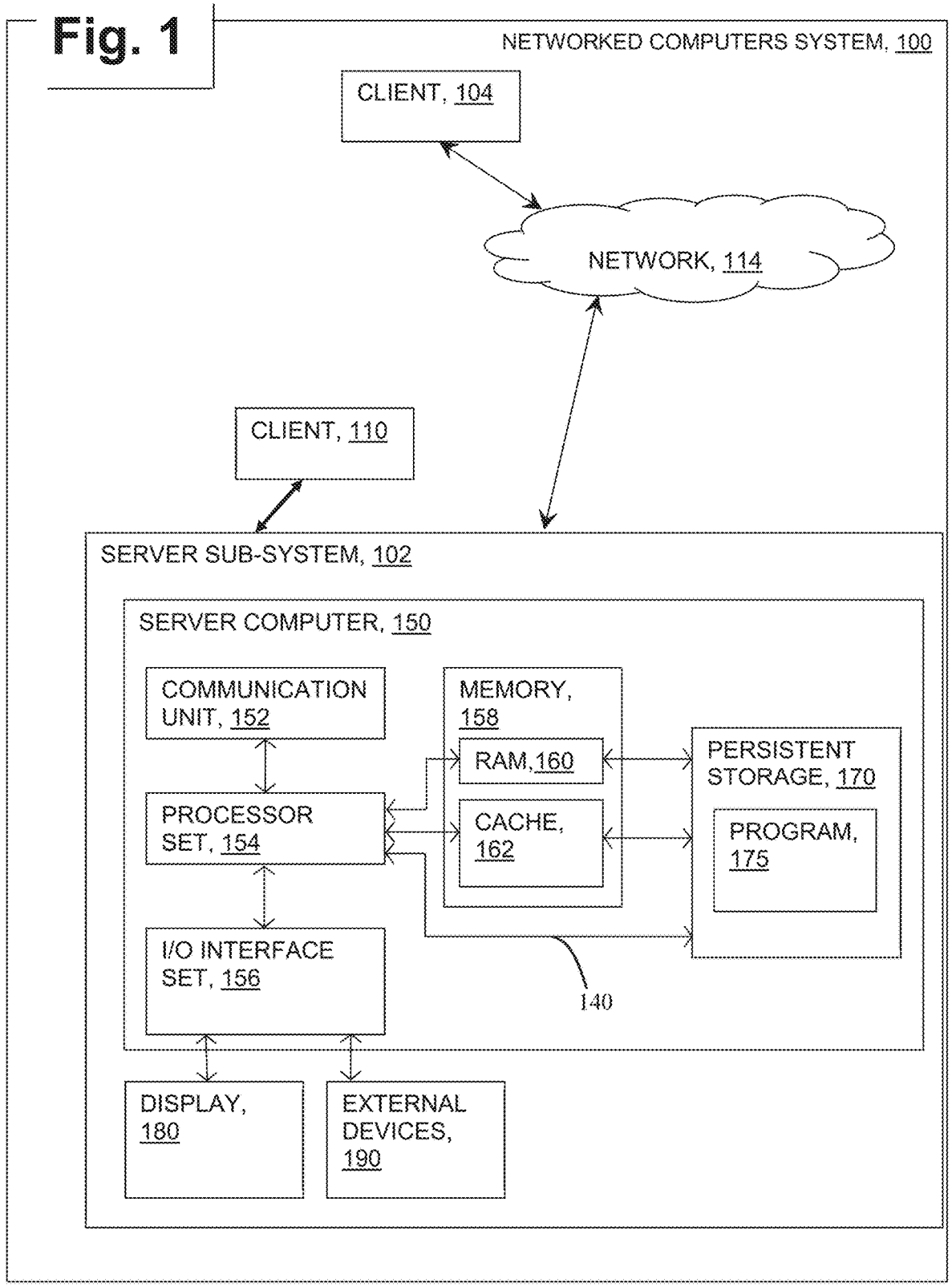
FIG. 1 provides a schematic illustration of a system, according to an embodiment of the invention.

FIG. 1 provides a schematic illustration of network resources associated with practicing the disclosed inventions. As shown in the figure, a networked Client device 110 connects wirelessly to server sub-system 102. Client device 104 connects wirelessly to server sub-system 102 via network 114. Client devices 104 and 110 comprise vehicle-access program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 100, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, comprising random access memory (RAM) 160 and cache memory 162, persistent storage 170, communication unit 152, input/output (I/O) interface(s) 156 and communications fabric 140. Communications fabric 140 provides communications between cache 162, memory 158, persistent storage 170, communication unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes (RAM) 160 and cache memory 162. In general, memory 158 can include any suitable volatile or non-volatile computer readable storage media. Cache memory 162 is a fast memory that enhances the performance of processor(s) 154 by holding recently accessed data, and data near recently accessed data, from memory 158.

Program instructions and data used to practice embodiments of the present invention, e.g., the driver behavior monitoring program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communication unit 152, in these examples, provides for communications with other data processing systems or devices, including resources of client computing devices 104, and 110. In these examples, communication unit 152 includes one or more network interface cards. Communication unit 152 may provide communications through the use of either or both physical and wireless communications links. Software distribution programs, and other programs and data used for implementation of the present invention, may be downloaded to persistent storage 170 of server computer 150 through communication unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., driver behavior monitoring program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
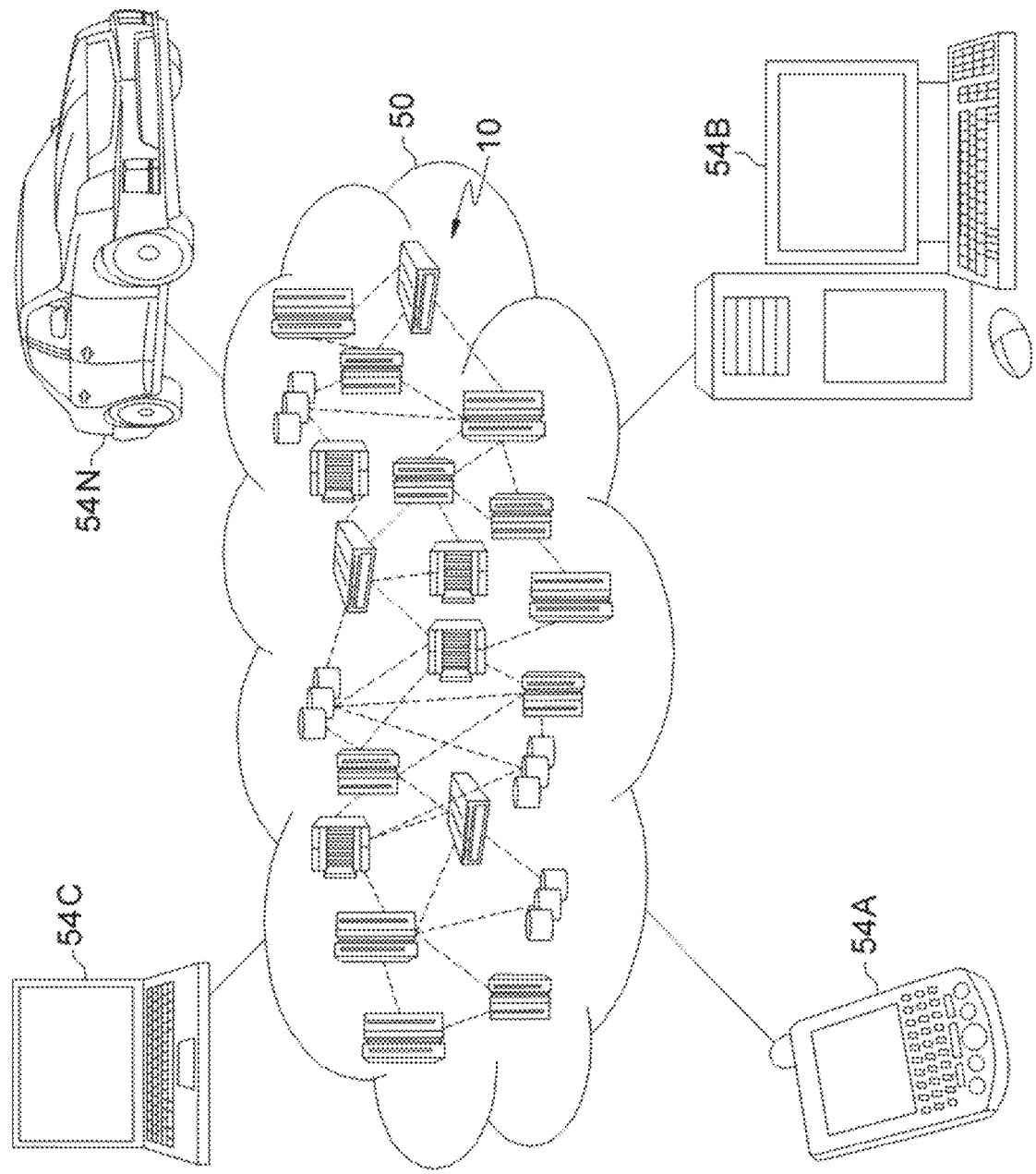
FIG. 2 depicts a cloud computing environment, according to an embodiment of the invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
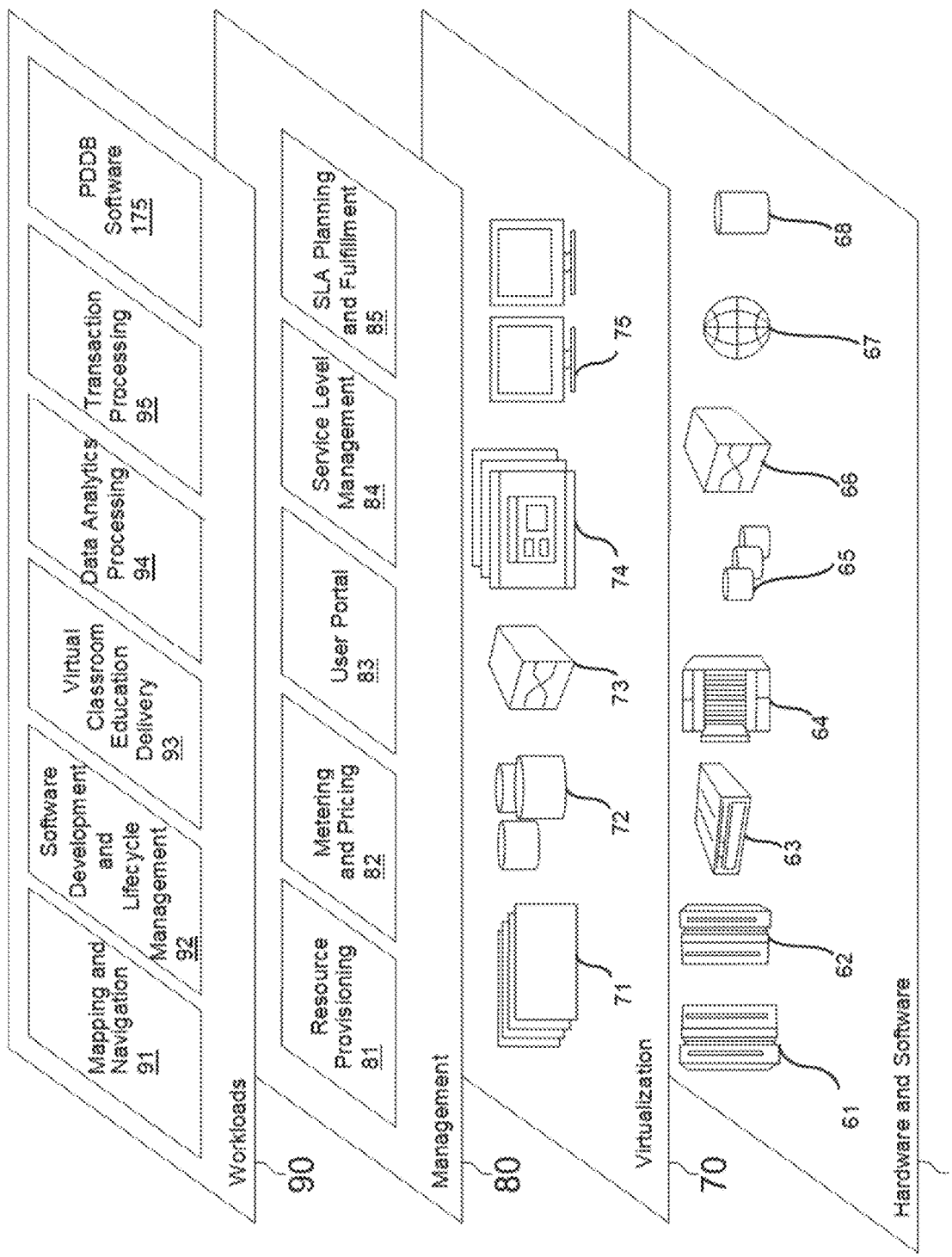
FIG. 3 depicts abstraction model layers, according to an embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 0 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and driver behavior monitoring program 175.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The user of the systems and methods described herein, described as a driver, constitutes a prospective driver seeking access to, and operational control of a vehicle. In an embodiment, managing vehicle operations according to driver behavior includes defining, a multi-dimensional preemptive driver daily behavior (PDDB) data structure. In this embodiment, the PDDB data structure comprises a data base for storing raw and aggregated driver behavior data. The data structure may be used to store driver identification biomarkers, such as fingerprint data, facial recognition data, and identifying speech data. The data structure may further store normal driver speech data collected via a microphone, driver movement data collected using accelerometers, biometric data such as heart rate, temperature, skin galvanic response, blood pressure and blood oxygen levels, as well as driver emotional state determined using artificial intelligence methods for deriving subject emotional state from speech data through IoT (Internet of Things) devices. For example, methods might include using a stacked generalization-based ensemble framework, n-gram features, and/or word frequency (or other related natural language processing technologies) in a machine-learning model to classify emotional state. Driver location, as well as duration at the location may be monitored using Global Positioning System (GPS) or WiFi location functionality. and stored in the data structure. Driver calendar information may be monitored from a device calendar app to identify specific events on the driver's schedule, these events may be added to a stored driver timeline maintained in the data structure. Driver demographic information may also be collected and stored in the data structure.

In an embodiment, the driver establishes the use of the systems and methods including the collection of their personal data related to the relevant behaviors. In this embodiment, the driver may install an application embodying the disclosed methods on their device and agree to the collection and use of their data, in addition to controlling any external sharing of their data beyond providing a result to a requesting vehicle.

In an embodiment, a driver having a history of impairment may be compelled by the state to install and use the disclosed system and methods as a condition of retaining driving privileges. In this embodiment, the driver would opt in to the collection, use and sharing of data in order to continue driving.

The disclosed systems and methods potentially utilize information collected from a range of devices under the control of a driver. Access to the information may be secured by the driver affirmatively establishing linkages between devices and opting in to the sharing and use of relevant information across a network of devices.

The data structure may be pre-populated with data collected from other drivers and aggregates as well as categorized by demographic markers. Upon receipt of a new driver's demographic information, the system may associate the new driver with baseline thresholds established from data associated with similar drivers.

Over time, data associated with the new driver will be added to the data structure. Data in the combination of provided and new data may be weighted, favoring data associated with the driver over data pre-populated in the data structure.

The stored data may be evaluated to determine behavior criteria. In an embodiment, respective data categories may be evaluated by calculating average data values and determining normal data value distributions, as well as standard deviation values for data sets in the data structure. These evaluations may be used to establish criteria for conditions and behaviors to be considered normal for a particular driver, as well as setting thresholds for behavior values to be considered abnormal.

Criteria may be established associated with particular locations such as restaurants or taverns wherein an analysis and assessment will be requested after a driver has spent more than a brief amount of time at such a location based upon location data. In this embodiment, the location and duration of stay data may indicate a need to request an assessment rather than serving as an indicator of abnormal behavior. Similarly, a review of driver calendar data may indicate a celebratory activity after which an assessment may be warranted. Driver calendar data may indicate a work-out session providing an explanation for biometric data outside of normal ranges and skewing the assessment toward allowing driver access despite data values outside normal ranges.

PDDB algorithms may be defined using the defined criteria. For example, an algorithm may be established wherein speech data indicating slurring, or a reduction in speech cadence more than twenty percent of previously observed speech data, a speech volume increase beyond a threshold associated with one or two standard deviations of normal speech volume data, an alteration of walking gait indicating an above threshold change in the regularity of the pace of steps, the ability to maintain an essentially straight path, and navigate around corners and obstacles, may be defined and used as an indication that these dimensions of driver behavior are abnormal. Other threshold values as well as other data set combinations may be used to define the PDDB algorithms for each dimension of behavior for which data is collected. Algorithms may be defined for data associated with the promptness and precision of interactions with a smartphone application associated with the method, changes in galvanic skin response beyond previously observed normal ranges, as well as calendar, activity, and location and duration of stay data in terms of defining normal, setting control limits based upon variations in the data for the dimension, and subsequently identifying instances wherein current data is outside the defined control limits for the dimension. The extent to which driver specific data versus pre-populated data is available may also be part of the algorithm definition such that pre-populated data unassociated with the specific driver does not result in incorrectly identifying normal behavior as abnormal.

For each dimension of PDDB data to be collected and stored in the data structure, a PDDB module is defined. The module establishes the source of the data to be collected, any post collection processing, aggregation or data smoothing to be applied to the data, as well as enabling the manual establishment of control limits for data dimensions to enable drivers to customize normal and abnormal thresholds. In one embodiment, unlocking access to setting manual threshold values requires establishing that the driver is exhibiting normal behavior under current criteria threshold values.

Once the modules for data have been constructed, data collection, storage and evaluation may begin. The data may be collected as set forth in the module definition, and then stored and analyzed using the criteria and algorithms. The analysis of the data using the criteria and algorithms yields a PDDB assessment. The PDDB assessment provides an indication that the driver should, or should not, be afforded operational control of, or access to, a vehicle.

In an embodiment, the respective criteria may be weighted with each criterion having a unique weight based upon an assessment algorithm. The assessment algorithm may consider multiple criteria and dimension related algorithms concurrently to determine if there is sufficient abnormal behavior across the set of considered dimensions to warrant denial of operational access to the vehicle. In an embodiment, the assessment may consider an indication of abnormal gait, speech and emotional state, together with changes in precision and promptness in the driver's interaction with the smartphone application, as sufficient to result in an assessment that operational control should be denied.

The respective weightings may evolve over time as additional data from the PDDB modules specific to the individual driver are added to the data structure. A recurrent neural network, or other machine learning architecture, may be used to evaluate the collected data and assign weights to the criteria as more data is added. In an embodiment, the neural network may be initially trained using data pre-populated in the system. The original weights may then be used to conduct the analysis and provide the assessment. As driver data is added, the neural network may alter the weights of respective criteria in performing the assessment according to variations between the individual driver and the data associated with a more generalized population of drivers (or demographically similar population of drivers).

The system provides communications capability using wireless communications links to communicate with a vehicle. In an embodiment, the communications may provide that operational access should be allowed, or that access and climate control system operation should be allowed but not transmission engagement, or perhaps that no access should be allowed, depending upon the specific PDDB assessment results.

In an embodiment, the assessment results may indicate a health or well-being issue sufficient to warrant communicating a need for alerting an outside entity such as emergency responder or law enforcement personnel to assist the driver. The assessment may yield a result indicating that vehicle access may be allowed but only autonomous vehicle operation may be engaged. In an embodiment, the assessment may result in communications to a vehicle indicating access may be allowed but also including instructions disabling vehicle operation or vehicle motion. In an embodiment, vehicle access and climate control system operation may be allowed while vehicle motion may be disabled.

In an embodiment, the system may be implemented using programming resident on a stand-alone device, such as a smart phone having communications linkages to internet of things sensors for capturing motion and biometric data, such as a fitness tracker. In one embodiment, the system further comprises a linkage to cloud resources wherein the storage of data as well as the analysis and assessment of the data are performed by cloud resources lessening the burden on local computational resources. In this embodiment, the local device sends data to the cloud resources, requests analysis on an ongoing basis and receives the assessment as a result of the analysis. The local system may then act in accordance with the received assessment.

In an embodiment, the system may not conduct ongoing analysis but may instead request analysis of the data in a specified time window as part of a larger process of obtaining driver access to a vehicle. In this embodiment, a properly equipped vehicle may request an assessment prior to granting access. The driver may then use the system to request the assessment based upon recent data and then provide communications associated with the results of the assessment to the requesting vehicle.

Figure 4:
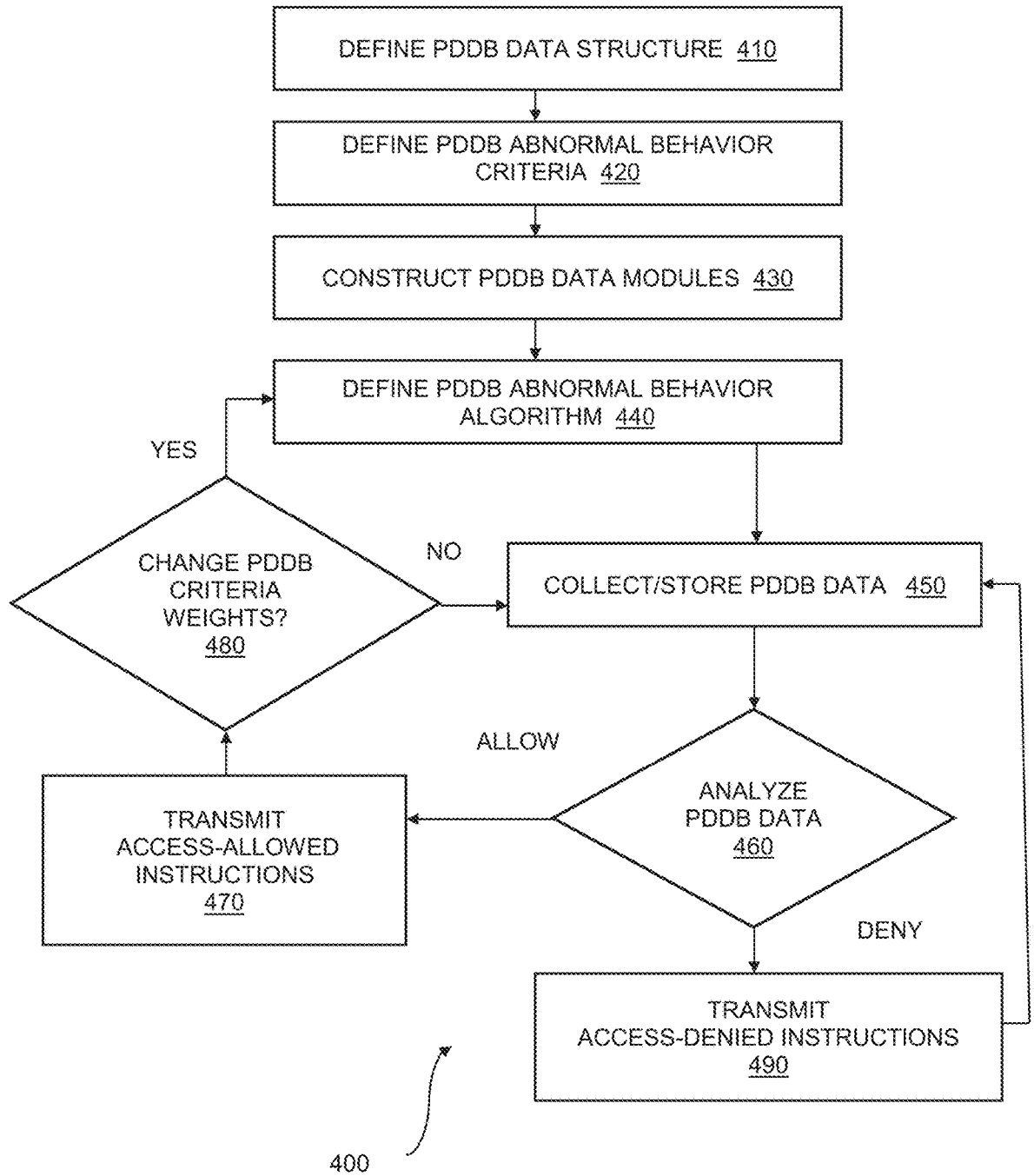
FIG. 4 provides a flowchart depicting an operational sequence, according to an embodiment of the invention.

Flowchart 400 of FIG. 4 illustrates operational aspects of an embodiment of the invention. At 410, a PDDB data structure is defined setting forth the respective data types included in the PDDB data collection and analysis. At 420, the PDDB criteria for the respective data types are defined including the thresholds for normal and abnormal behavior for a driver. PDDB modules establishing the source and processing parameters for PDDB data are defined at 430. At 440, the PDDB algorithm is defined, setting forth the use of the set of criteria in analyzing driver behavior, including differential weighting of respective criteria. At 450, PDDB data is collected and stored in the PDDB data structure. The stored PDDB data is analyzed according to the PDDB algorithm at 460. The analysis yields an assessment indicating driver access should either be allowed or denied by analyzing driver behavior using the PDDB algorithm. For access allowed, the driver access program follows the branch to 470 where communications associated with access allowed instructions associated with normal driver behavior are selected for transmission. An access allowed assessment also leads to 480 where the criteria weights of the algorithm are assessed in view of the new normal behavior data. A shift in criteria weights is warranted when there are differences between the driver's current normal behavior and the current algorithm weights. The algorithm criteria weighting may be adjusted at 440, with data collection and analysis resuming at 450 after the adjustment. When no criteria weighting adjustment is indicated, data collection at 450 resumes. In this embodiment, an assessment of abnormal driver behavior at 460 yields transmission of communications associated with the denial of driver vehicle access at 490 and the resumption of data collection at 450.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing vehicle operations according to driver behavior, the method comprising:

defining, by one or more computer processors, a multi-dimensional preemptive driver daily behavior (PDDB) data structure, wherein the PDDB data includes driver behavior data structure prior to driver being afforded operational control of a vehicle;

defining, by one or more computer processors, a PDDB abnormal behavior criteria including presence at particular locations for more than a threshold period of time for a PDDB data dimension;

defining, by one or more computer processors, a PDDB abnormal behavior algorithm for the PDDB data dimension;

constructing, by one or more computer processors, a PDDB monitoring module for the PDDB data dimension, wherein the PDDB monitoring module establishes a source of the PDDB data to be collected, and enables manual establishment of control limits for the PDDB data dimension;

collecting, by one or more computer processors, an instance of PDDB data including location data indicating current location;

storing, by one or more computer processors, the instance of PDDB data in the PDDB data structure;

acquiring, by one or more computer processors, a PDDB assessment including speech cadence after the instance of PDDB data corresponding to the PDDB abnormal behavior criteria;

and preemptively communicating, by one or more computer processors, driver vehicle-access instructions according to reduction in the speech cadence more than a threshold.

2. The computer implemented method according to claim 1 further comprising:

analyzing, by one or more computer processors, the instance of PDDB data according to the PDDB abnormal behavior criteria and the abnormal behavior algorithm, yielding a PDDB analysis; and providing, by one or more computer processors, another PDDB assessment according to the PDDB analysis.

3. The computer implemented method according to claim 1 further comprising:

sending, by one or more processors, the collected instance of PDDB data to a remote computer processor for PDDB analysis; and receiving, by one or more computer processors, the PDDB assessment.

4. The computer implemented method according to claim 1 wherein preemptively communicating driver vehicle-access instructions according to the PDDB assessment, comprises communications selected from a group consisting of: alerting an outside party, instructions denying vehicle-access, instructions disabling vehicle starting, instructions disabling vehicle motion, instructions enabling vehicle autonomous operation, and combinations thereof.

5. The computer implemented method according to claim 1 wherein the PDDB data structure includes location data, driver identification data, speech data, emotional state data, movement data, activity data, and event data.

6. The computer implemented method according to claim 1 wherein collecting the instance of PDDB data, includes collecting: driver identification data, speech data, emotional state data, movement data, activity, and event data.

7. A computer program product for managing vehicle operations according to driver behavior, the computer program product comprising:

one or more computer readable storage media and program instructions stored on the one or more computer readable storage media, the program instructions comprising:

program instructions defining a multi-dimensional preemptive driver daily behavior (PDDB) data structure, wherein the PDDB data consists of driver behavior data prior to driver being afforded operational control of a vehicle;

program instructions defining a PDDB abnormal behavior criteria including presence at particular locations for more than a threshold period of time for a PDDB data dimension;

program instructions defining a PDDB abnormal behavior algorithm for the PDDB data dimension;

program instructions constructing a PDDB monitoring module, wherein the PDDB monitoring module establishes a source of the PDDB data to be collected, and enables a manual establishment of control limits for the PDDB data dimension;

program instructions collecting an instance of PDDB data including location data indicating current location;

program instructions acquiring a PDDB assessment including speech cadence after the instance of PDDB data corresponding to the PDDB abnormal behavior criteria; and program instructions preemptively communicating driver vehicle-access instructions according to reduction in the speech cadence more than a threshold.

8. The computer program product according to claim 7 further comprising:

program instructions storing the instance of PDDB data in the PDDB data structure;

program instructions analyzing the instance of PDDB data according to the PDDB abnormal behavior criteria and abnormal behavior algorithm, yielding a PDDB analysis; and program instructions providing another PDDB assessment according to the PDDB analysis.

9. The computer program product according to claim 7 further comprising program instructions sending the collected instance of PDDB data to a remote computer processor for PDDB analysis; and program instructions receiving the PDDB assessment.

10. The computer program product according to claim 7 wherein the program instructions preemptively controlling driver vehicle-access according to the PDDB assessment, comprise program instructions for communications selected from a group consisting of: alerting an outside party, denying vehicle-access, disabling vehicle starting, disabling vehicle motion enabling vehicle autonomous operation, and combinations thereof.

11. The computer program product according to claim 7 wherein the multi-dimensional preemptive driver daily behavior (PDDB) data structure, includes data selected from the group consisting of: driver identification data, speech data, emotional state data, movement data, activity data, event data, and combinations thereof.

12. The computer program product according to claim 7 wherein the program instructions collecting the instance of PDDB data, includes program instructions collecting data including data selected from the group consisting of: driver identification data, speech data, emotional state data, movement data, activity data, event data, and combinations thereof.

13. A computer system for managing vehicle operations according to driver behavior, the computer system comprising:

one or more computer processors;

one or more computer readable storage devices;

program instructions stored on the one or more computer readable storage devices for execution by the at least on computer processor, the program instructions comprising:

program instructions defining a multi-dimensional preemptive driver daily behavior (PDDB) data structure, wherein the PDDB data structure consists of driver behavior data prior to driver being afforded operational control of a vehicle;

program instructions defining a PDDB abnormal behavior criteria including presence at particular locations for more than a threshold period of time for a PDDB data dimension;

program instructions defining a PDDB abnormal behavior algorithm for the PDDB data dimension;

program instructions constructing a PDDB monitoring module, wherein the PDDB monitoring module establishes a source of the PDDB data to be collected, and enables a manual establishment of control limits for the PDDB data dimension;

program instructions collecting an instance of PDDB data including location data indicating current location;

program instruction acquiring a PDDB assessment including speech cadence after the instance of PDDB data corresponding to the PDDB abnormal behavior criteria; and program instructions preemptively communicating driver vehicle-access instructions according to reduction in the speech cadence more than a threshold.

14. The computer system according to claim 13 further comprising:

program instructions storing the instance of PDDB data in the PDDB data structure;

program instructions analyzing the instance of PDDB data according to the PDDB abnormal behavior criteria and abnormal behavior algorithm, yielding a PDDB analysis; and program instructions providing another PDDB assessment according to the PDDB analysis.

15. The computer system according to claim 13 further comprising program instructions sending the collected instance of PDDB data to a remote computer processor for PDDB analysis; and program instructions receiving, the PDDB assessment.

16. The computer system according to claim 13 wherein the program instructions preemptively controlling driver vehicle-access according to the PDDB assessment, comprises program instructions for communications selected from the group consisting of: alerting an outside party, denying vehicle-access, disabling vehicle starting, disabling vehicle motion, enabling vehicle autonomous operation, and combinations thereof.

17. The computer system according to claim 13 wherein the multi-dimensional preemptive driver daily behavior (PDDB) data structure includes data selected from the group consisting of: driver identification data, speech data, emotional state data, movement data, activity data, event data, and combinations thereof.

18. The computer system according to claim 13 wherein the program instructions collecting the instance of PDDB data, include program instructions collecting data selected from the group consisting of: driver identification data, speech data, emotional state data, movement data, activity data, event data and combinations thereof.

* * * * *